United States Patent
Young et al.

(10) Patent No.: US 6,343,828 B1
(45) Date of Patent: Feb. 5, 2002

(54) TRUCK LID HINGE AND OPENER SYSTEM

(76) Inventors: David C. Young, 1829 7th Ave. NE., Thompson, ND (US) 58278; Lon N. Brorson, 1426 S. 15th St., Grand Forks, ND (US) 58201

(*) Notice: Subject to any disclaimer, the term of this patent is extended or adjusted under 35 U.S.C. 154(b) by 0 days.

(21) Appl. No.: 09/612,845

(22) Filed: Jul. 10, 2000

(51) Int. Cl.[7] .................................................. B60P 7/02
(52) U.S. Cl. ............................. 296/100.1; 296/100.06; 296/100.07; 296/100.08; 296/100.04
(58) Field of Search .................. 296/100.06, 100.07, 296/100.08, 100.1, 100.04

(56) References Cited

U.S. PATENT DOCUMENTS

| | | | |
|---|---|---|---|
| 577,838 A | 3/1897 | Cowan | |
| 3,051,523 A | * 8/1962 | Boyce-Smith et al. | 296/100.07 |
| 3,244,415 A | 4/1966 | Lunenschloss et al. | 268/50 |
| 3,704,039 A | * 11/1972 | Dean | 296/100.07 |
| 3,923,334 A | * 12/1975 | Key | 296/100.07 |
| 4,199,188 A | 4/1980 | Albrecht et al. | 296/100.04 |
| 4,324,429 A | 4/1982 | Wilson et al. | 296/100 |
| 4,522,440 A | * 6/1985 | Gostomski | 296/100.07 |
| D295,366 S | 4/1988 | Frolov | D8/330 |
| 4,762,360 A | * 8/1988 | Huber | 296/100.07 |
| 4,789,197 A | * 12/1988 | Lewis | 296/100.04 |
| 5,067,766 A | * 11/1991 | Lovaas | 296/100.04 |
| 5,102,185 A | * 4/1992 | Lake | 296/100.07 |
| 5,104,175 A | * 4/1992 | Enninga | 296/100.01 |
| 5,322,336 A | 6/1994 | Isler | 296/100 |
| 5,564,773 A | * 10/1996 | Lapsley et al. | 296/100.04 |
| 5,632,522 A | 5/1997 | Gaitan et al. | 296/100 |
| 5,681,074 A | * 10/1997 | Christensen | 296/100.06 |
| 5,687,507 A | 11/1997 | Beran | 49/340 |
| 5,878,530 A | 3/1999 | Eccleston et al. | 49/139 |
| 5,909,921 A | * 6/1999 | Nesbeth | 296/100.06 |
| 5,971,446 A | 10/1999 | Lunney, II | 286/100.08 |
| 5,988,728 A | * 11/1999 | Lund et al. | 296/100.08 |
| 6,007,137 A | * 12/1999 | Lambden | 296/100.06 |
| 6,186,580 B1 | * 2/2001 | Nothem et al. | 296/100.08 |

* cited by examiner

Primary Examiner—Joseph D. Pape
Assistant Examiner—Kiran B. Patel
(74) Attorney, Agent, or Firm—Zarley, McKee, Thomte, Voorhees & Sease; Dennis L. Thomte

(57) ABSTRACT

A truck lid hinge and opener system for removably connecting a lid or cover to the bed of a truck wherein the bed includes a vertical front wall, first and second vertical side walls extending rearwardly from the front wall, and a tailgate at the rearward end of the bed with the side walls having downwardly extending flanges at the upper end thereof. A pair of hinge units removably hingedly connect the forward end of the lid to the truck bed. A pair of like opener mechanisms pivotally interconnect the sides of the lid to the side walls of the truck bed. Each of the open mechanisms includes a gas spring which is adjustably mounted to compensate for varying temperature conditions. The hinge units and opener mechanisms are clamped onto the truck bed to avoid drilling holes in the truck bed.

6 Claims, 7 Drawing Sheets

TRUCK LID HINGE AND OPENER SYSTEM

BACKGROUND OF THE INVENTION

1. Field of the Invention

This invention relates to a truck lid hinge and opener system and more particularly to a system which places less stress on the hinges and which automatically raises the lid when the latch is unlocked.

2. Description of the Related Art

Many types of lids or covers have been previously provided for covering the bed of a pickup truck. The lids are normally hingedly secured to the forward end of the truck bed and in most cases, the mounting of the hinges requires drilling of holes into the truck bed. Normally, the lid cannot be quickly and easily removed from the bed of the truck without disassembling the hinge connection between the truck bed and the lid. Further, many types of available lids place undue stress on the hinge connection which sometimes results in failure thereof. Another drawback to certain of the available truck lids is that they must be manually raised to their open position. In some cases, gas springs have been utilized to assist in raising the truck lids to their open positions, but temperature conditions have a dramatic affect on the efficiency of the gas springs. Yet another disadvantage of certain of the prior art truck lid opening systems is that they do not prevent "free-fall" of the lid when the lid is being moved from its open position to its closed position.

SUMMARY OF THE INVENTION

A truck lid hinge and opener system is disclosed for removably connecting a lid or cover to the bed of a truck wherein the bed includes a vertical front wall, first and second vertical side walls extending rearwardly from the front wall, and a tailgate at the rearward end of the bed with the side walls having downwardly extending flanges at the upper end thereof. The hinge system of the invention includes a pair of like hinge units. Each of the hinge units comprises a mounting plate which is clamped onto one of the truck bed vertical flanges adjacent the forward end thereof with the mounting plate including a first hinge plate portion which extends forwardly over the upper end of the vertical front wall of the truck bed. The first hinge plate portion has a forward end which is positioned forwardly of the vertical front wall of the truck bed with the forward end of the first hinge plate portion having an elongated slot formed therein which is parallel to the front wall of the bed. A second hinge plate portion is secured to the lid at the forward end thereof with the second hinge plate portion having an arcuate connector element extending therefrom which is removably hingedly received by the slot in the forward end of the first hinge plate portion to hingedly connect the lid to the truck bed.

The opener system comprises an opening mechanism at each side of the lid rearwardly of the hinge units. Each of the opener mechanisms comprises a lower arm having its lower end pivotally connected to a mounting plate which is clamped onto the flange of one of the side walls of the bed. An upper arm is pivotally connected at its lower end to the upper end of the lower arm and has its upper end pivotally connected to a bracket which is secured to the underside of the lid. A gas spring has its base end pivotally connected to the upper arm adjacent the upper end thereof and has its rod end selectively adjustably secured to the lower arm intermediate the length thereof.

A locking pawl is rotatably mounted in the lid and has a lower end positioned below the lid. A pair of spring-loaded locking rods are rotatably secured to the lower end of the locking pawl with the rods extending to the opposite sides of the lid with the locking lids being resiliently urged outwardly to the sides of the lid. Each of the lift mechanisms includes a striker plate which is mounted on the lower bracket which engages the outer end of the associated locking rod, as the lid is moved downwardly to its closed position, until the outer end of the locking rod passes beneath the lower end of the striker plate at which time the locking rod moves outwardly beneath the lower end of the striker plate to lock the lid in position. When the locking pawl is rotated to move the outer ends of the locking rods from beneath the striker plates, the gas springs automatically move the lid to its open position.

It is therefore a principal object of the invention to provide an improved hinge and lift assembly for hingedly mounting a lid to the bed of a truck.

Still another object of the invention is to provide a hinge and lift assembly of the type described wherein the lid automatically rises to its open position once the latch is unlocked.

Still another object of the invention is to provide a hinge and lift assembly of the type described which provides resistance when closing the lid to prevent free-fall thereof.

Still another object of the invention is to provide a hinge and lift assembly of the type described which places less stress on the hinges thereof.

Yet another object of the invention is to provide a hinge and lift assembly for hingedly mounting a lid to the bed of a truck wherein better side-to-side stability is provided.

Still another object of the invention is to provide adjustable gas springs or shocks for a truck bed lid for various weather conditions.

Still another object of the invention is to provide a hinge and lift assembly for hingedly mounting a lid to the bed of a truck wherein the lift assemblies are attached towards the rear of the vehicle, thus eliminating buckling during hot weather.

These and other objects will be apparent to those skilled in the art.

DESCRIPTION OF THE PREFERRED EMBODIMENT

Figure 1:
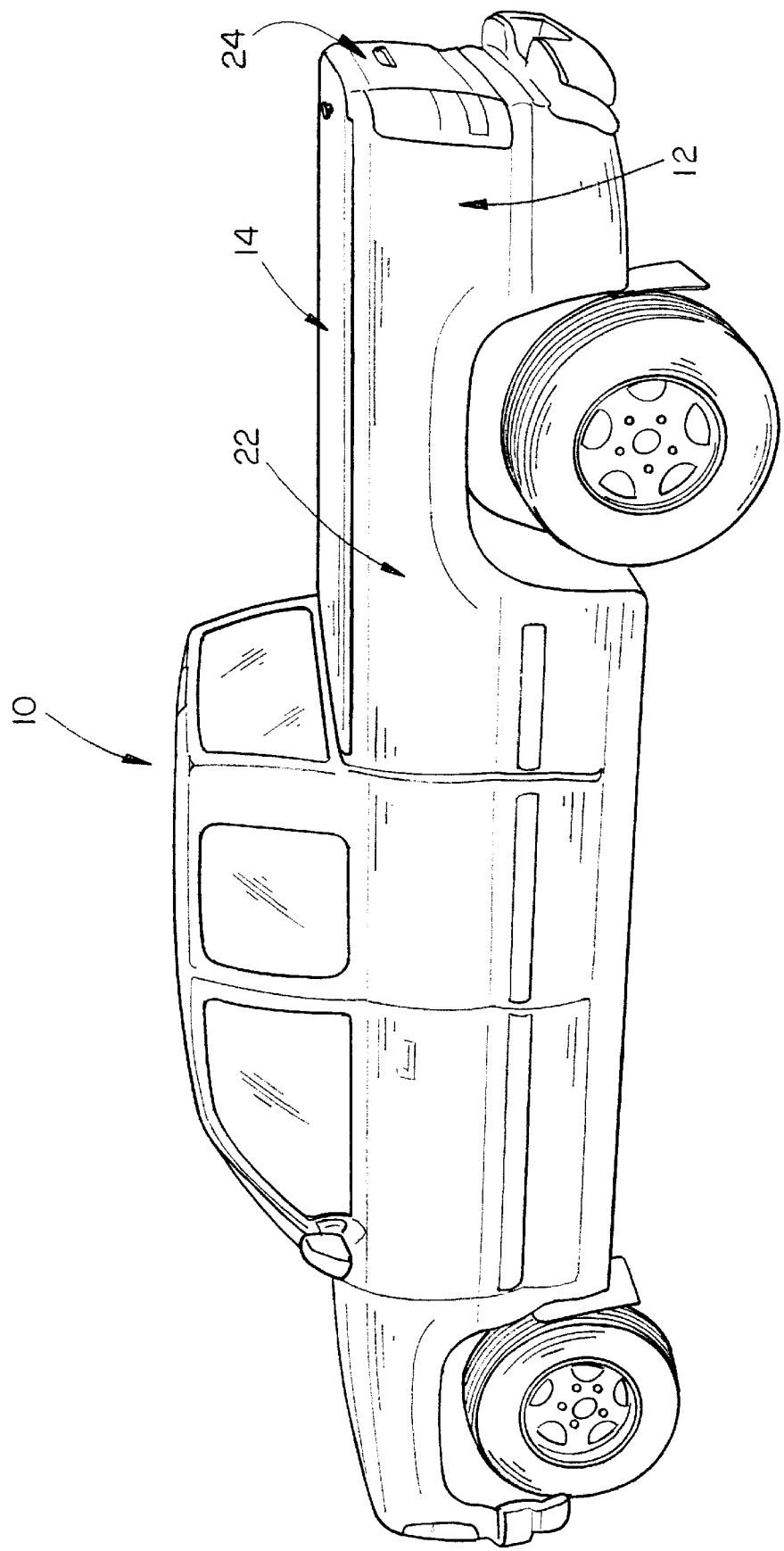
FIG. 1 is a perspective view of a pickup truck having the lid of this invention mounted thereon.

In the drawings, the numeral 10 refers to a pickup truck having a bed 12 at the rearward end which has the lid or cover 14 hingedly mounted thereon. Bed 12 includes a vertically disposed front wall 16 having a frame member 18 extending across the upper inner end thereof. Bed 12 also includes vertically disposed side walls 20 and 22 and a pivotal tailgate 24. Side walls 20 and 22 are provided with vertically disposed flanges 26 and 28 at their upper ends, respectively.

The forward end of lid 14 is hingedly secured to the bed 12 by a hinge mechanism referred to generally by the reference numeral 30 which comprises a pair of hinge units 32 with one of the hinge units 32 being positioned adjacent the forward end of side wall 20 and the other hinge unit 32 being positioned adjacent the forward end of side wall 22. The only difference between the two hinge units 32 is that they are mirror images of one another. Hinge unit 32 includes a vertically disposed mounting plate or bracket 34 which is clamped onto the forward end of flange 26 through the use of bolts 36 which extend through plate 34 and which have plates 38 threadably mounted on the inner ends thereof with the plates 38 being positioned behind the flange 26. A first hinge plate portion 40 is secured to the forward end of plate 34 by gusset 42 and has a plate portion 44 which is horizontally disposed and which is positioned on the upper end of front wall 16. The forward end of plate portion 44 extends forwardly of the forward end of front wall 16 and has an elongated slot 46 formed therein. The numeral 48 refers to a second hinge plate portion which is secured to the lid 14 by bolts and which has an arcuate connector element 50 extending downwardly and forwardly therefrom which is adapted to be received in the slot 46 to hingedly connect the lid 14 to the bed 12. The reception of the connector element 50 in the elongated slot 46 also provides lateral or side-to-side stability of the lid with respect to the bed 12.

Figure 2A:
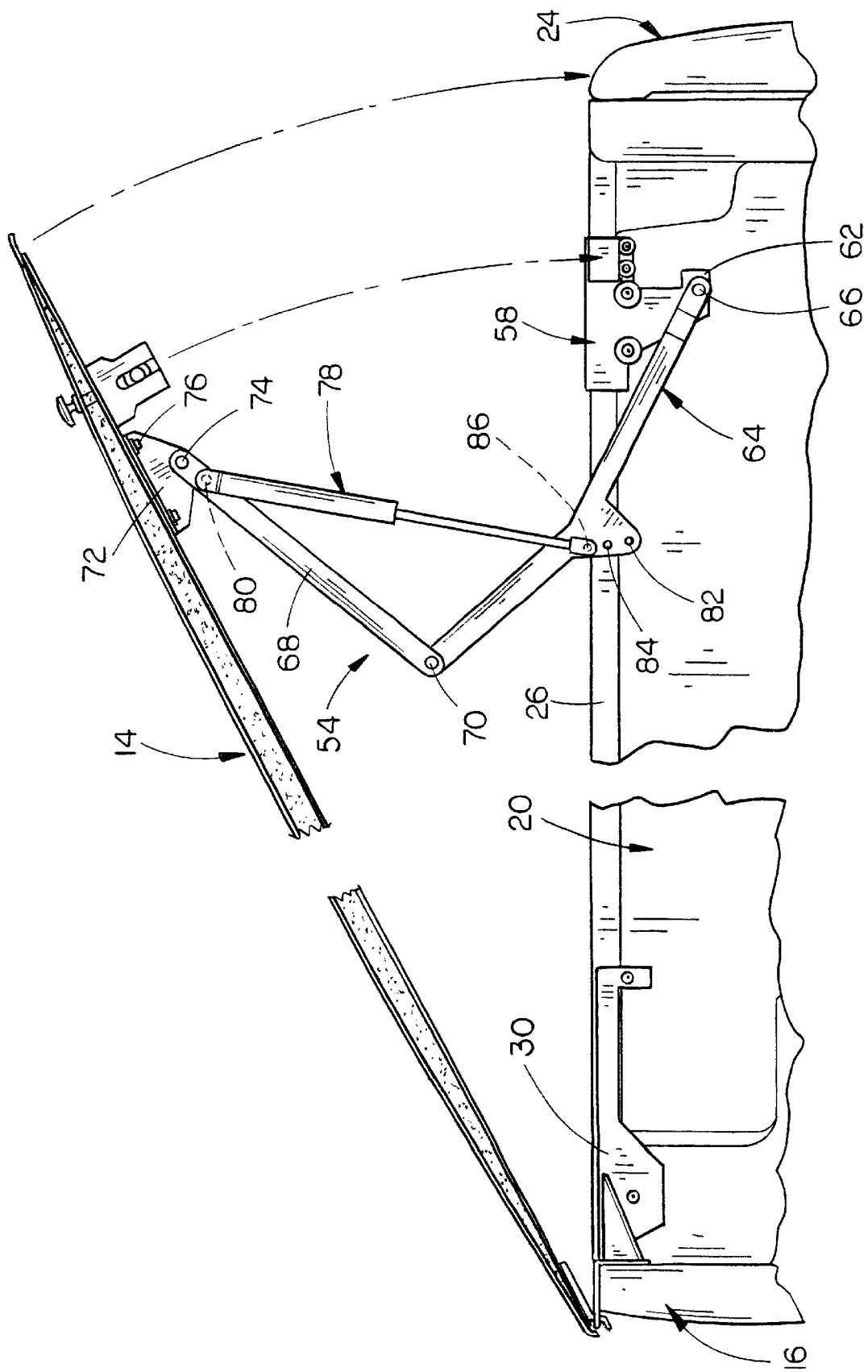
FIG. 2A is a sectional view of the lid illustrating the manner in which the lid is pivotally connected to the bed of the truck and illustrating one of the lift mechanisms.
Figure 2B:
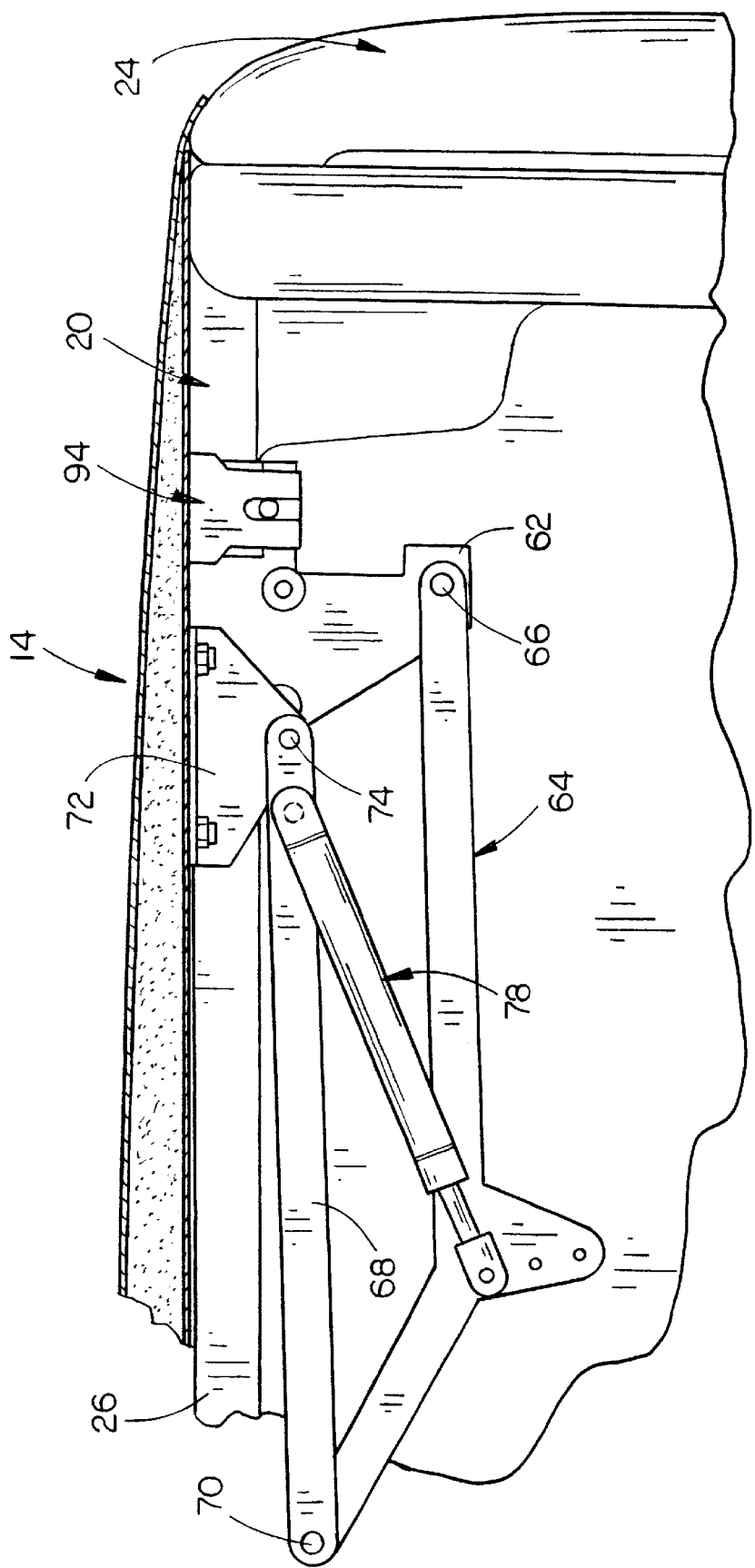
FIG. 2B is a view similar to FIG. 2A except that the lid is shown in its closed position.

The numeral 52 refers generally to the lid opener mechanism which is comprised of lift mechanisms 54 and 56. Inasmuch as lift mechanisms 54 and 56 are identical, only lift mechanism 54 will be described in detail with "'" indicating identical structure on lift mechanism 56. Lift mechanism 54 includes a lower bracket 58 which is clamped onto the flange 26 of side wall 20 in much the same fashion as the hinge mechanism 32 is clamped onto the flange 26. Lower bracket 58 includes a horizontally disposed portion 60 which rests upon the upper end of the side wall 20 and a lower portion 62 which is positioned below the upper end of the side wall 20. An angular lower arm 64 is pivotally connected at its lower end to the lower portion 62 at 66 and has an upper arm 68 pivotally secured to its upper end (forward) at 70. The upper (rearward) end of upper arm 68 is pivotally connected to upper bracket 72 at 74. Upper bracket 72 is secured to the underside of lid 14 by bolts or screws 76. The upper end of gas spring 78 is pivotally connected to the upper end of upper arm 68 at 80 and has its rod end pivotally connected to lower arm 64 intermediate the length thereof. As seen in FIG. 2A, lower arm 64 has three spaced-apart openings 82, 84 and 86 formed therein to enable the rod end of gas spring 78 to be selectively adjustably secured to lower arm 64 so that the gas spring may be adjusted to compensate for varying temperature conditions. For example, in extreme cold temperature conditions, the rod of the gas spring 78 may be pivotally secured to the uppermost opening 86 while in extreme hot temperatures, the rod of the gas spring 78 may be pivotally secured to the opening 82. The adjustability feature of the gas spring 78 is desired, since there will be greater gas pressure within gas spring 78 in hot temperatures and will have less gas pressure therein during cold temperatures.

Figure 3:
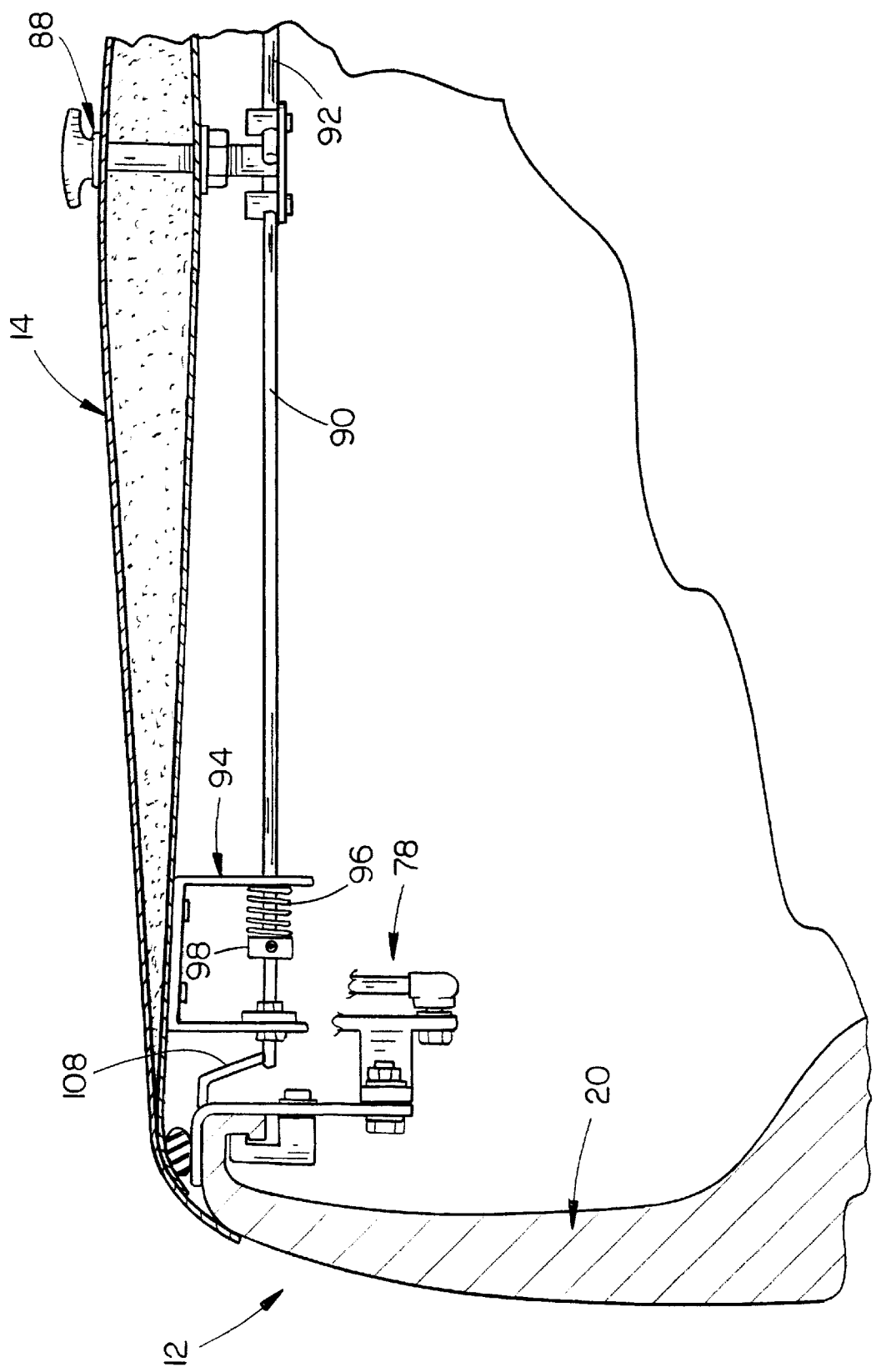
FIG. 3 is a partial transverse sectional view of the lid in its closed position.
Figure 4:
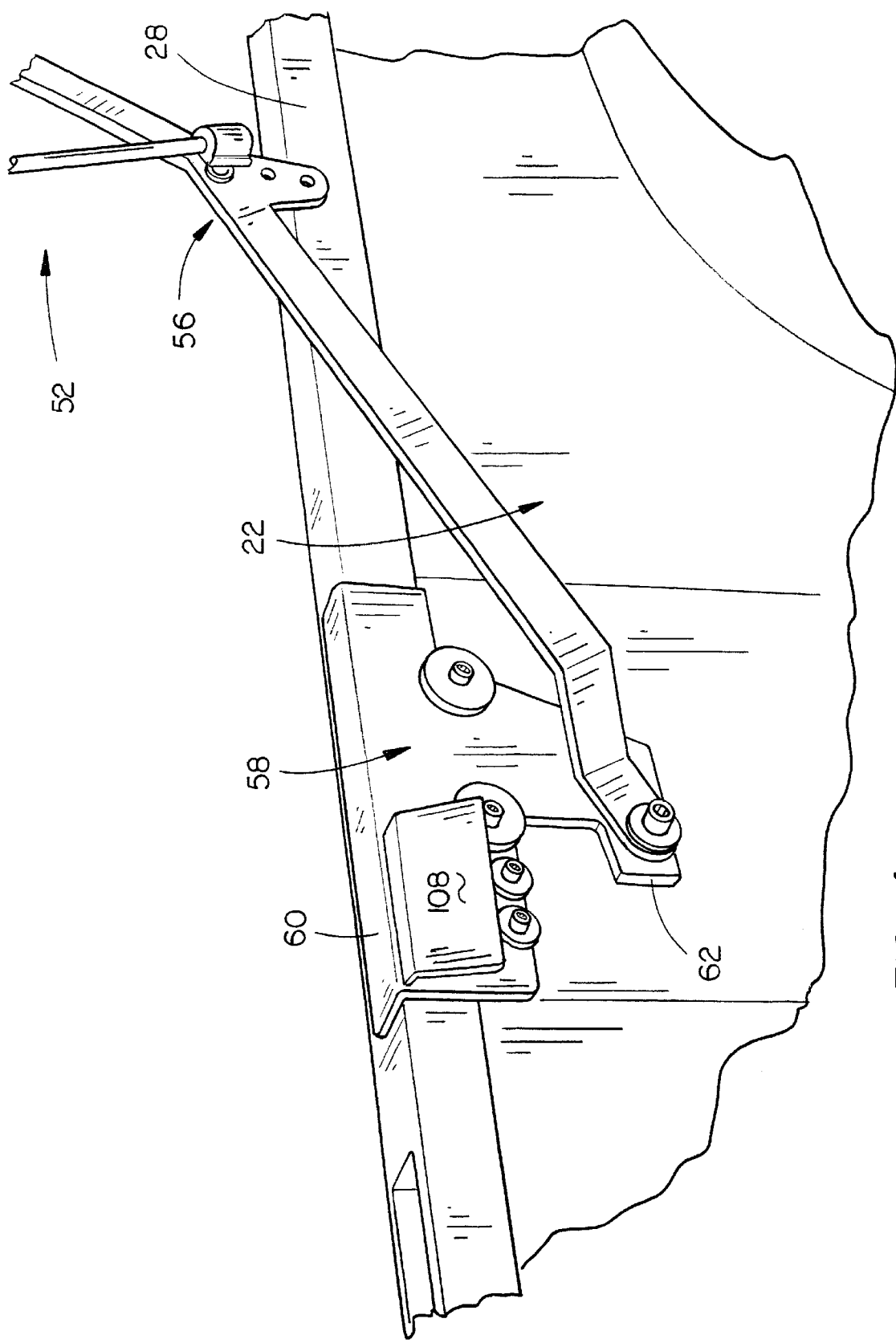
FIG. 4 is a perspective view of the tower portion of one of the lift mechanisms.
Figure 5:
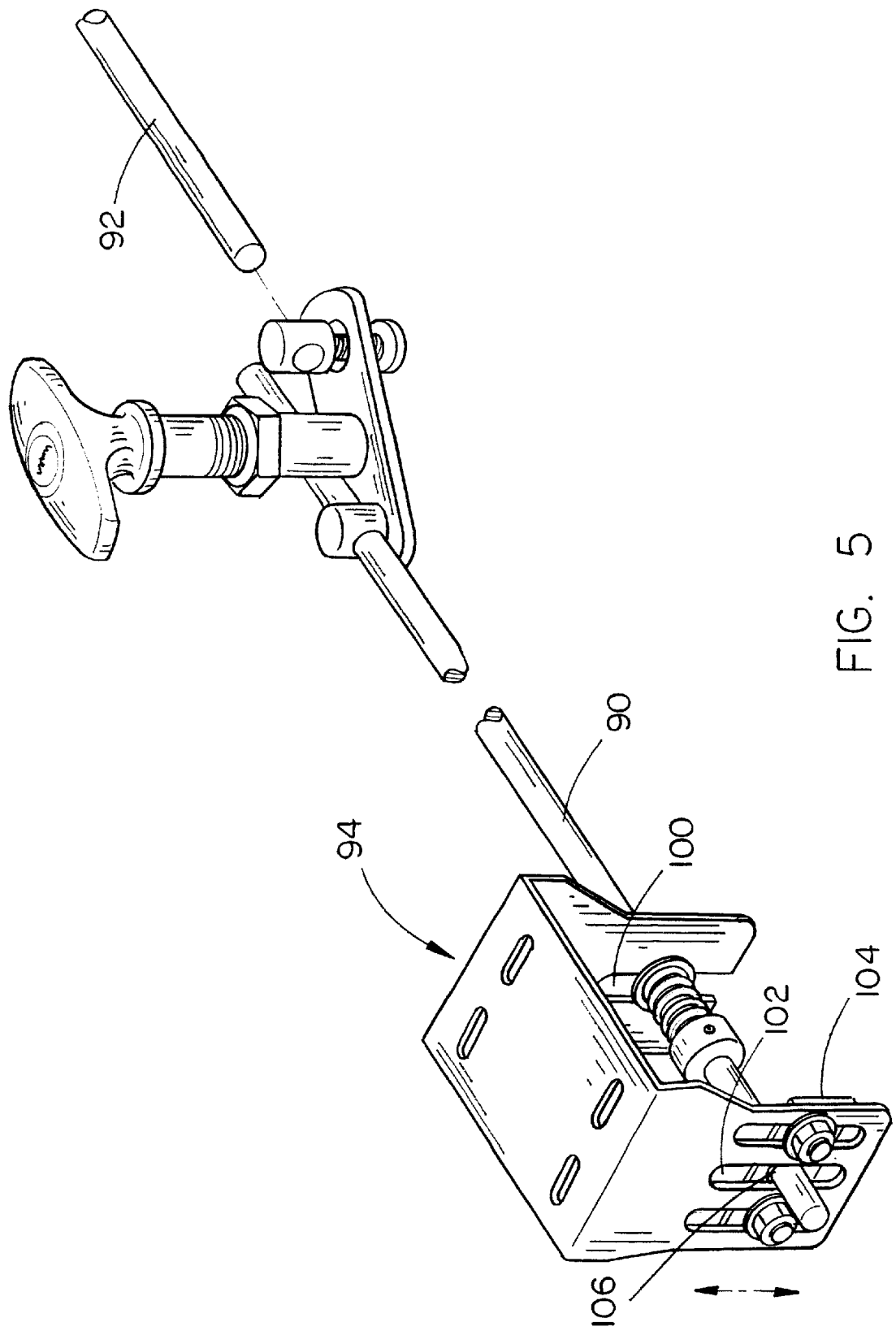
FIG. 5 is a partial perspective view of one of the locking rod mechanisms.
Figure 6:
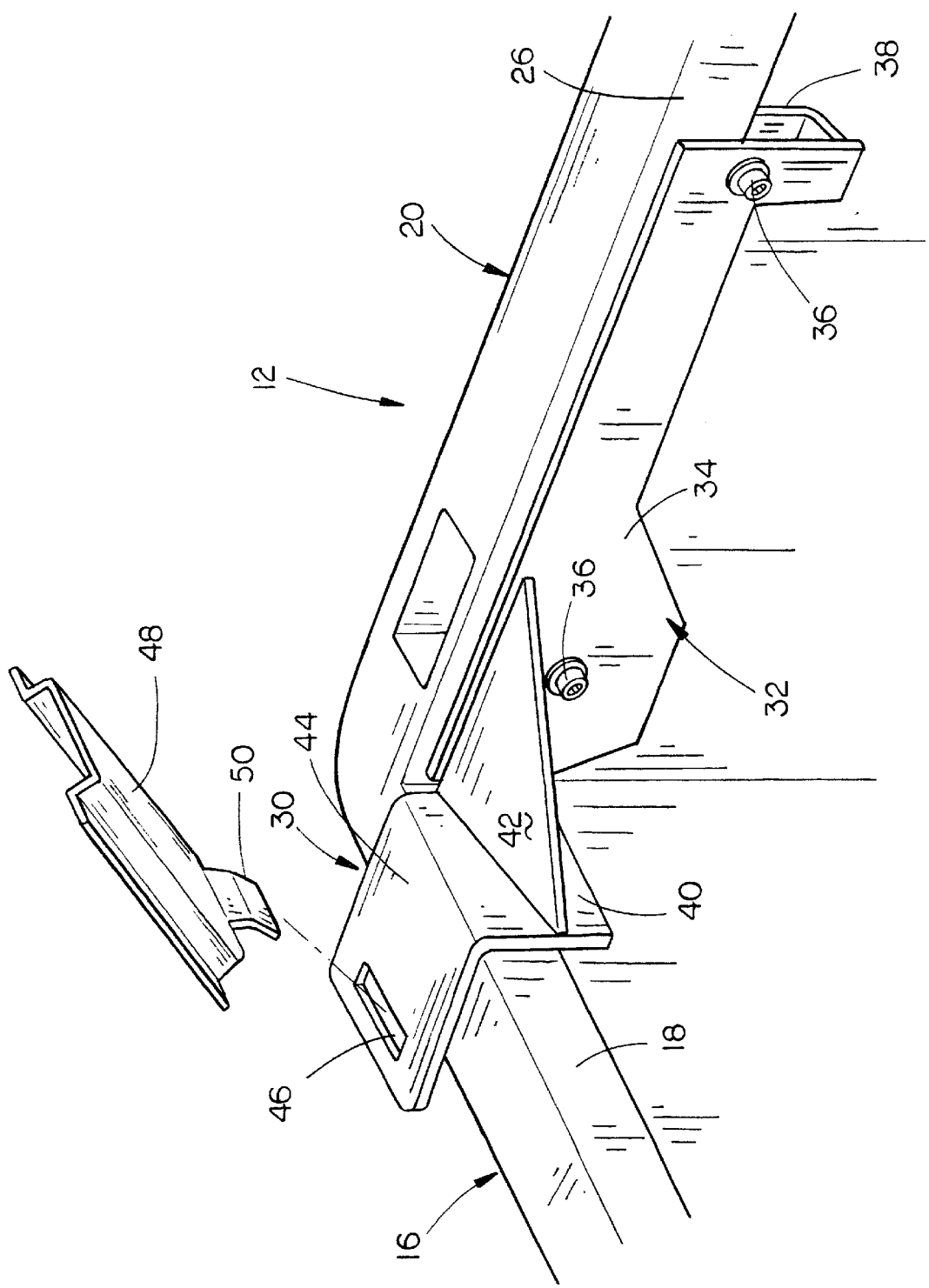
FIG. 6 is a perspective view illustrating the manner in which the lid is hinged to the bed of the truck.

A locking pawl 88 extends downwardly through the lid 14 intermediate the lift mechanisms 54 and 56 and has a pair of spring-loaded locking rods 90 and 92 pivotally secured to the lower end thereof. Locking rod 90 extends to lift mechanism 54 while locking rod 92 extends to lift mechanism 56. Locking rod 90 extends through a U-shaped bracket 94 and has spring 96 mounted thereon, as seen in FIG. 3. An adjustable locking collar 98 is mounted on the rod 90 within bracket 94 and is adapted to vary the compression of the spring 96. As seen in FIG. 5, bracket 94 includes elongated slots 100 and 102 which vertically slidably receive the rod 90. Plate 104 is vertically adjustably mounted on the bracket 94 by bolts and has an opening 106 formed therein which receives the rod 90. Thus, the relationship of the rod 90 may be vertically adjusted with respect to the bracket 94.

An inclined and angularly disposed striker plate 108 is secured to lower bracket 58 and extends inwardly therefrom. As lid 14 is being lowered to its closed position, the outer end of the locking rod 90 engages the striker plate 108 which causes the rod 90 to be moved inwardly against the compression of the spring 96. When the lid 14 reaches its closed position, the outer end of the rod 90 will pass beneath the lower end of the striker plate 108 and will be positioned below the lower edge thereof, as illustrated in FIG. 3, to lock the lid 14 in its closed position. The rod 92 interacts with the striker plate 108' in an identical fashion.

When it is desired to open the lid 14, the locking pawl 88 is unlocked and rotated which will cause the outer ends of the locking rods 90 and 92 to be moved inwardly of the striker plates 108 and 108'. At that time, the gas springs 78 will automatically raise the lid to its upper, open position. The opening of the lid occurs without any assistance from the person opening the lid. The gas springs provide resistance to the closing of the lid to prevent free-fall of the lid. The fact that the lift mechanisms are attached to the lid toward the rear of the vehicle eliminates buckling during hot weather. As stated, the multiple attachment points for the gas springs permit the lift mechanisms to be adjusted for various weather conditions. The pivotal connection of the lower arm 64 to the lower brackets 58 at a point below the upper end of the side walls also assists in the raising of the lid to its open position. The hinge connection of the lid to the bed enables the lid to be hinged thereto without drilling holes in the bed. Further, the lid may be easily mounted on the bed and easily removed therefrom.

Thus it can be seen that the invention accomplishes at least all of its stated objectives.

We claim:

1. In combination with a truck having a bed, such bed including a vertical front wall, first and second side walls extending rearwardly from the front wall, and a tailgate at the rearward end of the bed, said walls and tailgate defining an open upper end, and a lid for selectively closing said upper end;

a lift assembly for hingedly mounting the lid to the truck bed, said lift assembly comprising:

a hinge means hingedly securing the forward end of the lid to the truck bed whereby the lid may be selectively pivotally moved between a substantially horizontally disposed closed position over the truck bed to a position wherein the rearward end of the lid is disposed in an open position above the truck bed; a lift mechanism at each side of the lid; each of said lift mechanisms comprising:

(a) a lower bracket secured to one of the side walls of the truck bed and having a rearward end, a forward end, an upper end, and a lower end which is disposed below the upper end of the side wall;
(b) a lower arm having upper and lower ends;
(c) said lower end of said lower arm being pivotally secured to said lower end of said lower bracket and extending forwardly therefrom;
(d) an upper arm having upper and lower ends;
(e) said lower end of said upper arm being pivotally secured to the upper end of said lower arm;
(f) an upper bracket secured to the lid adjacent one of the side edges thereof;
(g) said upper end of said upper arm being pivotally secured to said upper bracket;
(h) an elongated gas spring having upper and lower ends;
(i) said upper end of said gas spring being pivotally connected to said upper arm;
(j) said lower end of said gas spring being pivotally secured to said lower arm intermediate the length thereof.

2. The combination of claim 1 wherein said lower end of said gas spring is selectively mounted to said lower arm.

3. The combination of claim 1 wherein said lower end of said gas spring is vertically selectively mounted to said lower arm.

4. The combination of claim 1 wherein said lower bracket is clamped onto the side wall of the truck bed.

5. The combination of claim 1 further including a locking pawl rotatably mounted in the lid which has a lower end positioned below the lid and wherein a pair of spring-loaded locking rods are rotatably secured to the locking pawl which extend to the opposite sides of the lid with the locking rods being resiliently urged outwardly to the sides of the lid, each of the lift mechanisms including a striker plate having upper and lower ends, the outer ends of said locking rods engaging the striker plates as the lid is moved to its closed position to move the locking rods inwardly until the outer ends of the locking rods pass from the lower ends of the striker plates whereby the locking rods move outwardly below the lower ends of the striker plates to lock the lid in its closed position.

6. The combination of claim 5 wherein the outer ends of said locking rods are selectively vertically adjustably guided.

* * * * *